United States Patent
Nichols et al.

(10) Patent No.: US 7,337,434 B2
(45) Date of Patent: Feb. 26, 2008

(54) OFF-DEVICE CLASS/RESOURCE LOADING METHODS, SYSTEMS AND COMPUTER PROGRAM PRODUCTS FOR DEBUGGING A JAVA APPLICATION IN A JAVA MICRO DEVICE

(75) Inventors: Paul H. Nichols, Raleigh, NC (US); Jian Li, Morrisville, NC (US); Jeremy Roth, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 830 days.

(21) Appl. No.: 10/424,566

(22) Filed: Apr. 28, 2003

(65) Prior Publication Data
US 2004/0221268 A1    Nov. 4, 2004

(51) Int. Cl.
*G06F 9/44* (2006.01)
(52) U.S. Cl. .................... 717/132; 717/134; 717/166
(58) Field of Classification Search ........ 717/131–134, 717/166; 712/227
See application file for complete search history.

(56) References Cited

U.S. PATENT DOCUMENTS

| | | | |
|---|---|---|---|
| 6,226,665 B1* | 5/2001 | Deo et al. .................... 718/106 |
| 2002/0099865 A1 | 7/2002 | Fukumori et al. | |
| 2003/0023661 A1* | 1/2003 | Clohessy et al. ........... 709/104 |
| 2003/0074650 A1* | 4/2003 | Akgul et al. ................ 717/129 |

FOREIGN PATENT DOCUMENTS

| | | |
|---|---|---|
| EP | 1 265 137 A2 | 12/2002 |
| WO | WO 98/37486 A1 | 8/1998 |
| WO | WO 01/57663 A2 | 8/2001 |
| WO | WO 02/065228 A2 | 8/2002 |

OTHER PUBLICATIONS

Mahmoud, Testing Wireless Java Applications, Nov. 2002, Sun, pp. 1-5.*
Marszalek, et al. Aptix, ARM and Agilent Introduce An Integrated SOC Validation Platform for Embedded System Design, D & R Headline News, pp. 1-3, Apr. 10, 2001.*
"Notification of Transmittal of The International Search Report and the Written Opinion of the International Searching Authority, or the Declaration", "Written Opinion of the International Searching Authority" and "International Search Report", PCT/IB2004/000153, May 30, 2005.

(Continued)

*Primary Examiner*—Eric B. Kiss
(74) *Attorney, Agent, or Firm*—Myers Bigel Sibley & Sajovec

(57) ABSTRACT

A Java application is debugged in a Java micro device by selectively loading from a host computer into the device, a subset of Java classes and/or Java resource files that is used during the debugging the Java application in the device, that is automatically selected from a set of Java classes and/or Java resource files in the host computer. Thus, the need to load a potentially huge Java ARchive (JAR) file that contains all classes and/or resources, at the start of debugging, can be reduced or eliminated. The invention also may be used to load modules that are used during debugging an application on a device from a host computer.

12 Claims, 6 Drawing Sheets

OTHER PUBLICATIONS

Sun Microsystems, "Forte™ for Java™ 4, Mobile Edition Tutorial" Online! Jun. 2002, Sun Microsystems, Santa Clara, CA, XP002327892, Retrieved from the Internet: URL:http://developers.sun.com/prodtech/javatools/jsstandard/reference/docs/s1s4/ffjmetut.pdf, retrieved on May 11, 2005.

Sun Microsystems, Datasheet, *Java™ 2 Platform, Micro Edition*, 2002, 2 pp.

Rommel, *The Java-enabled wireless world—Java will dominate the market for small, smart devices*, Java World, Mar. 2000, 3pp.

* cited by examiner

OFF-DEVICE CLASS/RESOURCE LOADING METHODS, SYSTEMS AND COMPUTER PROGRAM PRODUCTS FOR DEBUGGING A JAVA APPLICATION IN A JAVA MICRO DEVICE

FIELD OF THE INVENTION

This invention relates to data processing methods, systems and computer program products using Java, and more particularly to systems, methods and computer program products for debugging Java applications.

BACKGROUND OF THE INVENTION

Java™ (Trademark of Sun Microsystems. Inc.) is a full-featured object oriented programming language. Thus, Java programs (applications) are written by creating a structured set of software components that interact with each other to produce the desired effects. These components are called objects, and may be arranged in a hierarchy of object classes, also simply referred to as classes. Instead of running directly on a computer's operating system, Java programs run on a Java Virtual Machine (JVM™—Trademark of Sun Microsystems, Inc.), which itself is a program that runs on a computer's operating system. Due to the object oriented nature of Java and the standardization of JVMs, Java programs may provide "Write Once, Run Anywhere" (WORA) capabilities. Java is well known to those of skill in the computer art, and need not be described further herein.

As the use of Java has expanded, it has been extended to larger and smaller scale platforms. Thus, Java has now been extended beyond Java 2 Platform, Standard Edition (J2SE™—Trademark of Sun Microsystems. Inc.) for servers and personal computers, to Java 2 Platform, Enterprise Edition (J2EE™—Trademark of Sun Microsystems. Inc.), which is a platform independent Java-centric environment for developing, building and deploying enterprise applications, and Java 2 Platform, Micro Edition (J2ME™—Trademark of Sun Microsystems. Inc.), which allows developers to use Java to create applications for wireless, mobile and consumer devices such as personal digital assistants, set top boxes, embedded devices, and mobile phones.

In J2ME, the JVM is often referred to as a Kilobyte Virtual Machine (KVM), to indicate its small size. A J2ME Mobile Information Device Profile (MIDP) allows a developer to write downloadable applications and services for J2ME devices. These applications and services are often referred to as MIDlets.

The design and operation of J2ME is summarized, for example, in the Data Sheet entitled *Java 2 Platform, Micro Edition,* Sun Microsystems, Inc., 2002. Moreover, it will be understood that, as used herein, the term "J2ME" is used to indicate any memory limited device which uses a micro version of Java.

Many vendors provide a Java Integrated Development Environment (IDE) as part of or in conjunction with a Software Developer's Kit (SDK). An IDE also may be provided separate from an SDK. As shown in FIG. 1, an IDE 110 can run on a host computer, also referred to herein simply as a host 120, which can comprise a personal computer or a workstation, and interfaces with an emulator 130. The IDE 110 can also interface with an actual J2ME device 140 that includes therein a KVM 150 and one or more applications (MIDlets) 160. The connection 170 between the host 120 and the J2ME device 140, can be wired and/or wireless. The interface 112 between the IDE 110 and the emulator 130 is referred to as a Unified Emulator Interface (UEI). An interface may be provided between the KVM 150 on the J2ME device 140 and the IDE 110 via the wired and/or wireless connection 170.

As is well known to those having skill in the art, in designing an application (MIDlet) 160, it may be desirable to debug the application during and/or after the design phase. Many debugging techniques are well known to those having skill in the art, and need not be described herein. In fact, the IDE 110 generally provides source level debugging of an application using the emulator 130. Unfortunately, in order to successfully debug an application 160, a new emulator 130 may need to be provided for each J2ME device 140 for which an application 160 is to be written. Moreover, it may be desirable to debug the application 160 on the KVM 150 in the J2ME device 140 itself. Unfortunately, the limited size of the KVM 150 may make it time consuming to load the debug program onto the J2ME device. Moreover, the limited size of the KVM 150 may make it impossible, in some circumstances, to run the debug program on the J2ME device 140. It is also known for the developer to package selected files for loading on the J2ME device 140.

SUMMARY OF THE INVENTION

Embodiments of the present invention can debug a Java application in a J2ME device by selectively loading from a host computer into the J2ME device, a subset of Java classes and/or Java resource files that is used during the debugging the Java application in the J2ME device, that is automatically selected from a set of Java classes and/or Java resource files in the host computer. Thus, the need to load a potentially huge Java ARchive (JAR) file that contains the entire set of J2ME classes and/or resources, at the start of debugging, can be reduced or eliminated. Instead, in some embodiments of the invention, only those classes/resources that are used during the debugging the Java application may be loaded automatically into the J2ME device from the host computer.

In some dynamic embodiments, Java classes and/or Java resource files are loaded from the host computer into the J2ME device as they are referenced during the debugging the Java application. In specific embodiments, a JAR file and, in some embodiments, an empty JAR file, is installed on the J2ME device. The Java application is debugged in the J2ME device until a Java class and/or a Java resource file is referenced. The Java class and/or Java resource file is requested from the host computer and is loaded into the KVM. The debugging the Java application is then continued in the J2ME device using the Java class and/or the Java resource file that was loaded into the KVM. The operations of requesting a Java class and/or a Java resource file, loading the requested class and/or resource file and continuing the debugging can be repeatedly performed in sequence when a new Java class and/or a new Java resource file is referenced during the debugging.

In other static embodiments, the subset of Java classes and/or Java resource files that are used during the debugging is automatically determined at the host computer and loaded into the J2ME device from the host computer. More specifically, in some embodiments, an entry point class is obtained for the debugging the Java application. Additional Java classes and/or Java resource files that are referenced from the entry point class during the debugging are recursively determined. A list of preinstalled classes/resources is used to exclude those additional Java classes and/or Java resource files that are preinstalled in the J2ME device. A JAR file then is installed on the J2ME device and the entry point class and the additional Java classes and/or Java resource files that are recursively determined, except for the additional Java classes and/or Java resources files that are preinstalled in the J2ME device, are loaded into the KVM.

In yet other hybrid embodiments, aspects of the dynamic embodiments and the static embodiments described above may be combined. For example, some of the subset of Java classes and/or Java resource files that are used during the debugging is automatically determined at the host computer and loaded into the J2ME device from the host computer, as was described above. Then, during the debugging the Java application, if a Java class and/or Java resource file that is not already loaded in the KVM is referenced, the referenced Java class and/or Java resource file is loaded from the host computer into the J2ME device. Other hybrid embodiments also may be provided.

In other embodiments of the invention, the subset of Java classes and/or Java resource files that are used during the debugging the Java application is automatically loaded into the J2ME device from the host computer when in a development mode. In contrast, in a deployment mode, Java classes and/or Java resource files that are preinstalled on the J2ME device are used.

Embodiments of the present invention were described above primarily with respect to method aspects. However, it will be understood that embodiments of the present invention can also provide systems and/or computer program products for debugging a Java application in a J2ME device, and may also provide an IDE for a J2ME device and a J2ME device itself. Moreover, although embodiments of the present invention have been described with respect to MIDlet debugging in a J2ME device, embodiments of the invention also may be applied to debugging a Java application in any Java device, i.e., in any device that runs Java. Finally, other embodiments of the invention may be used to debug any application that runs in a device, whether or not the application is a Java application, another object oriented programming application or a conventional functional application. The device can be a Java device, a device that operates using non-Java object oriented programming systems, or a device that uses conventional functional programming. Thus, embodiments of the invention can be used for off-device/loading of code modules (such as objects, libraries, subroutines, classes, etc.) with other programming languages such as C, C++, PERL, NET, that run in pervasive, personal, application and/or enterprise devices.

DETAILED DESCRIPTION

Figure 1:
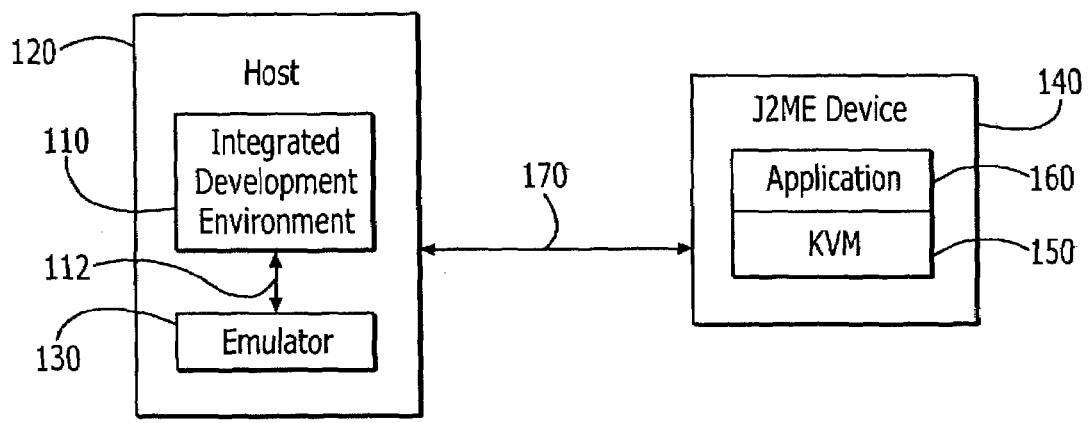
FIG. 1 is a block diagram of a conventional J2ME debugging environment.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that, in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
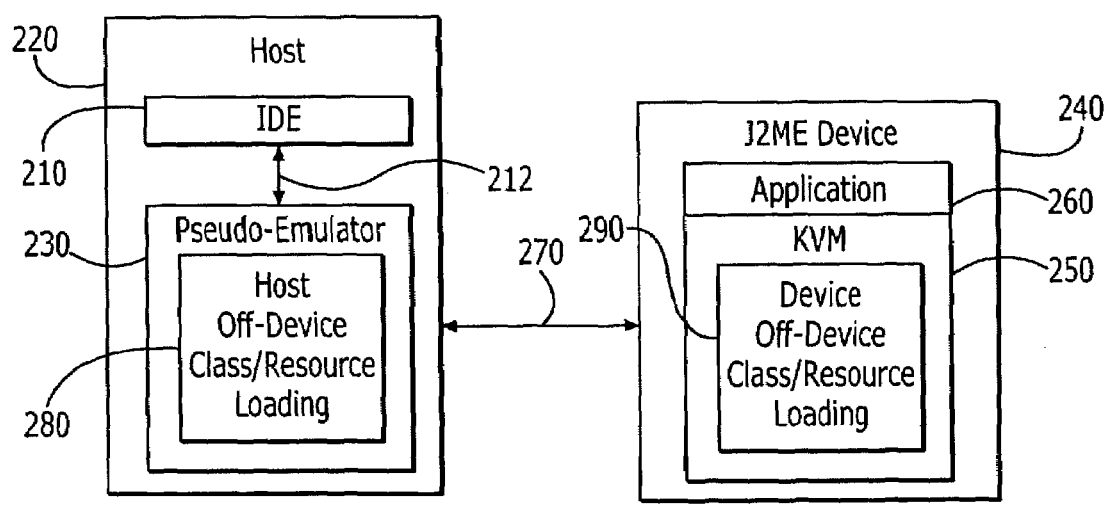
FIG. 2 is a block diagram of systems, methods and computer program products for debugging Java applications in a J2ME device according to embodiments of the present invention.

FIG. 2 is a block diagram of systems, methods and/or computer program products that may be used to debug a Java application or MIDlet 260 in a J2ME device 240 according to various embodiments of the present invention. A host 220 includes thereon an IDE 210. An interface may be used to provide a wired and/or wireless connection 270 between the host 220 and the J2ME device 240 for debugging. An application (MIDlet) 260 runs on a KVM 250 on the J2ME device 240. The design and operation of the components described in this paragraph are well known to those having skill in the art and need not be described further herein.

Still referring to FIG. 2, according to embodiments of the present invention, a pseudo-emulator 230 may be provided, that can interface with the IDE 210 using a UEI interface 212. Host Off-Device Class/Resource Loading (or loader) functionality 280 may be added to the pseudo-emulator 230 and Device Off-Device Class/Resource Loading (or loader) functionality 290 may be added to the J2ME device 240. The Host Off-Device Class/Resource Loading functionality 280 may be provided in one or more modules and/or circuits as part of an SDK, and may be integrated at least partially within the IDE 210 and/or the pseudo-emulator 230, or may comprise one or more separate modules and/or circuits that interface with the IDE 210 and/or the emulator 230. Similarly, on the J2ME device 240, the Device Off-Device Class/Resource Loading functionality 290 may be provided in one or more modules and/or circuits integrated at least partially within the KVM 250 and/or the application 260, or may comprise one or more separate modules and/or circuits.

Figure 3:
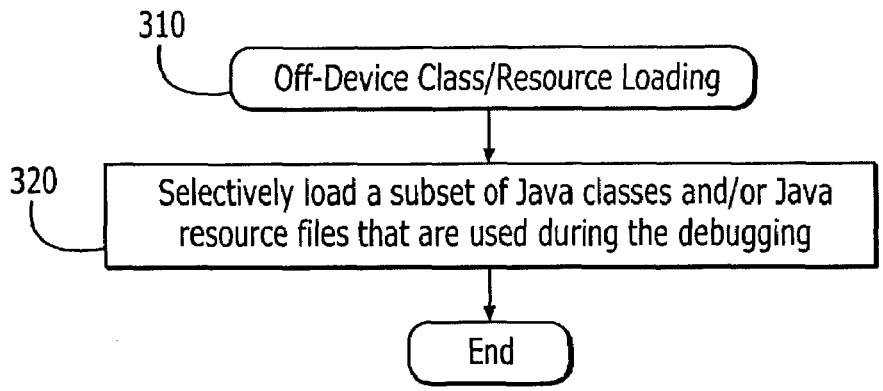
FIGS. 3-8 are flowcharts of operations that may be performed to debug a Java application in a J2ME device according to various embodiments of the present application.

FIG. 3 is a flowchart of operations that may be performed to debug a Java application, such as application 260, in a J2ME device, such as the J2ME device 240, according to some embodiments of the present invention. It will be understood that these operations may be performed by the Host Off-Device Class/Resource Loading functionality 280 and/or the Device Off-Device Class/Resource Loading functionality. 290 of FIG. 2. As shown in FIG. 3, at Block 320, Off-Device Class/Resource Loading 310 may be provided by selectively loading from a host computer, such as the host 220, into the J2ME device, a subset of Java classes and/or Java resource files that is used during the debugging the Java application in the J2ME device 240, that is automatically selected from a set of Java classes and/or Java resource files in the host 220. Load time, therefore, may be reduced and a debug may be successfully performed on a small KVM 250.

Figure 4:
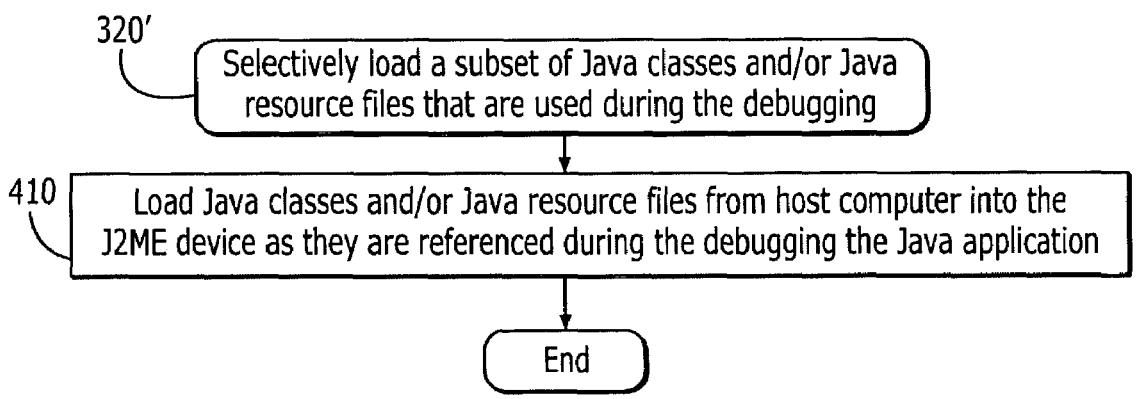
Figure 5:
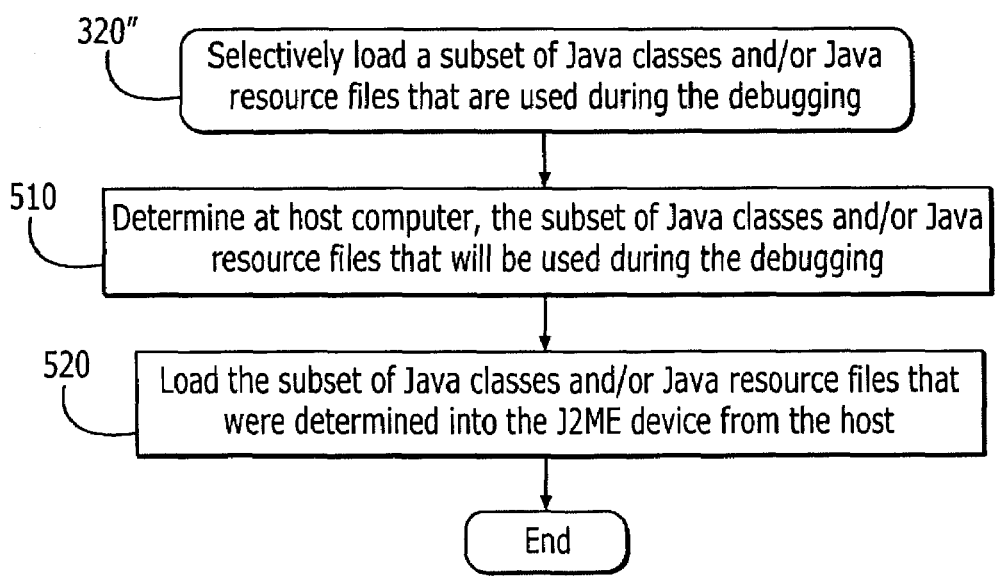

FIGS. 4 and 5 are flowcharts that illustrate other embodiments of Block 320 of FIG. 3. In particular, as shown in FIG. 4, in dynamic embodiments 320', Java classes and/or Java resource files are only loaded from the host computer 220 into the J2ME device 240 as they are referenced during the debugging the Java application 260, at Block 410. Alternatively, as shown in FIG. 5, in static embodiments 320", a determination is automatically made, at the host 220, of the subset of Java classes and/or Java resource files that will be used during the debugging the Java application, at Block 510. Then, at Block 520, the subset of Java classes and/or Java resource files that was automatically determined at Block 510 is loaded into the J2ME 240 device from the host 220. Hybrid embodiments, which combine aspects of FIGS. 4 and 5, also may be provided. Embodiments of FIG. 4 and/or FIG. 5 also may be performed on a "per class/file" basis and/or for multiple classes and/or files. It will be understood that some program constructs with in an application can bypass the ability to statically determine which classes may be referenced at run time. Thus, embodiments of FIG. 5 may not be able to automatically determine all classes/resource files that will be referenced. Hybrid embodiments therefore may be employed.

Figure 6:
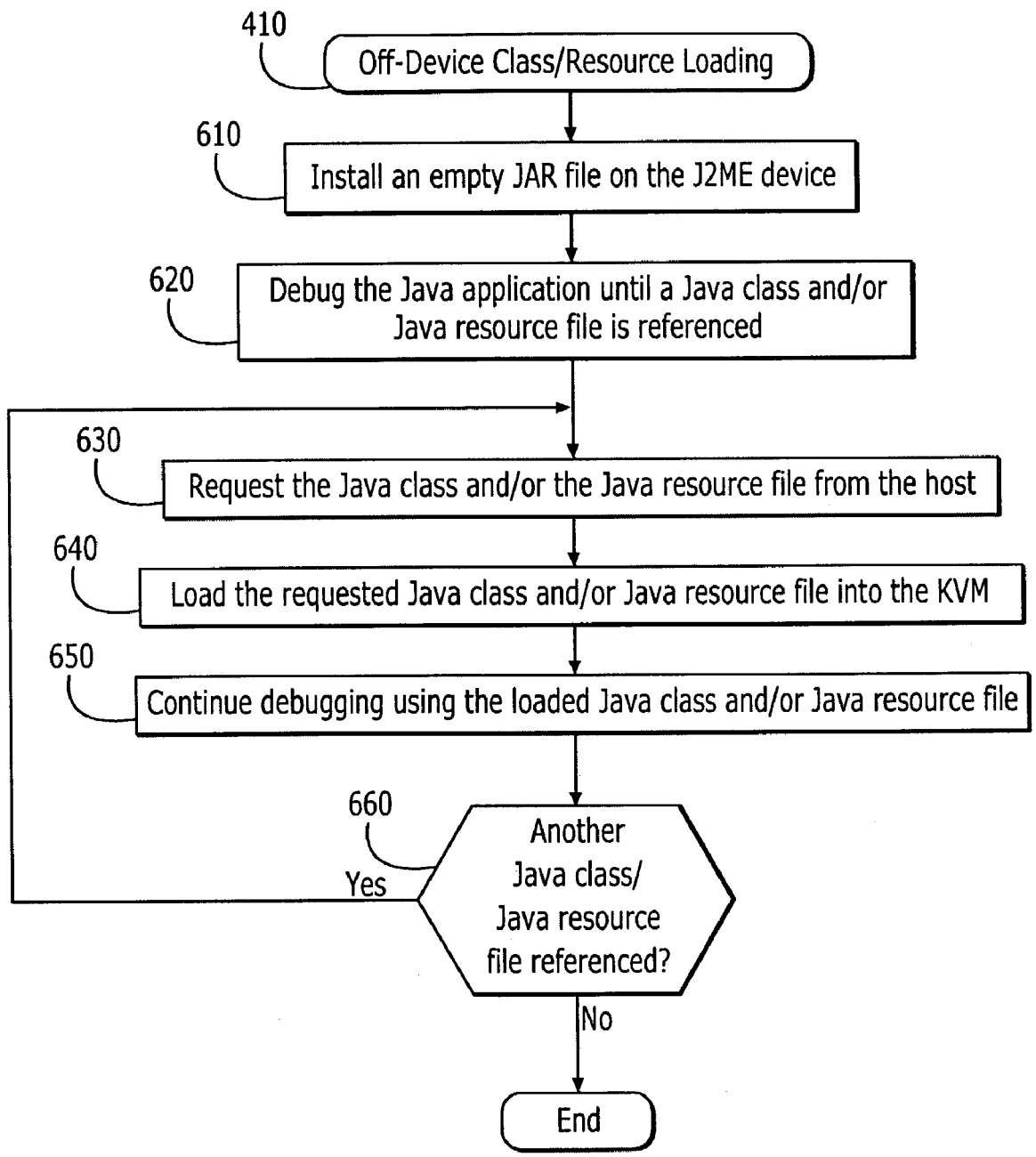

FIG. 6 is a flowchart of operations that may be used to load Java classes and/or Java resource files from the host computer into the J2ME device as they are referenced during the debugging the Java application, which may correspond to Block 410 of FIG. 4. As shown at Block 610, an empty JAR file is installed on the J2ME device. As is well known to those having skill in the art, the JAR file enables a developer to bundle multiple files into a single archive file. Typically, a JAR file will contain the class files and auxiliary resources associated with applications. At Block 620, the Java application is debugged in the J2ME device 240 until a Java class and/or a Java resource file is referenced. At Block 630, the Java class and/or the Java resource file is requested from the host computer 220. At Block 640, the Java class and/or the Java resource file that was requested from the host computer 220 is loaded into the KVM. At Block 650, the debugging is continued in the J2ME device 240 using the Java class and/or the Java resource file that was loaded into the KVM.

Still continuing with the description of FIG. 6, in some embodiments, at Block 660, a determination is made as to whether another Java class and/or Java resource file is referenced during the debugging. If so, operations of Blocks 630, 640 and 650 are repeated until no further Java classes or resource files are needed or the debug is ended. Thus, operations of Block 630, 640 and 650 may be repeatedly performed in sequence when a Java class and/or a Java resource file is referenced during the debugging.

Figure 7:
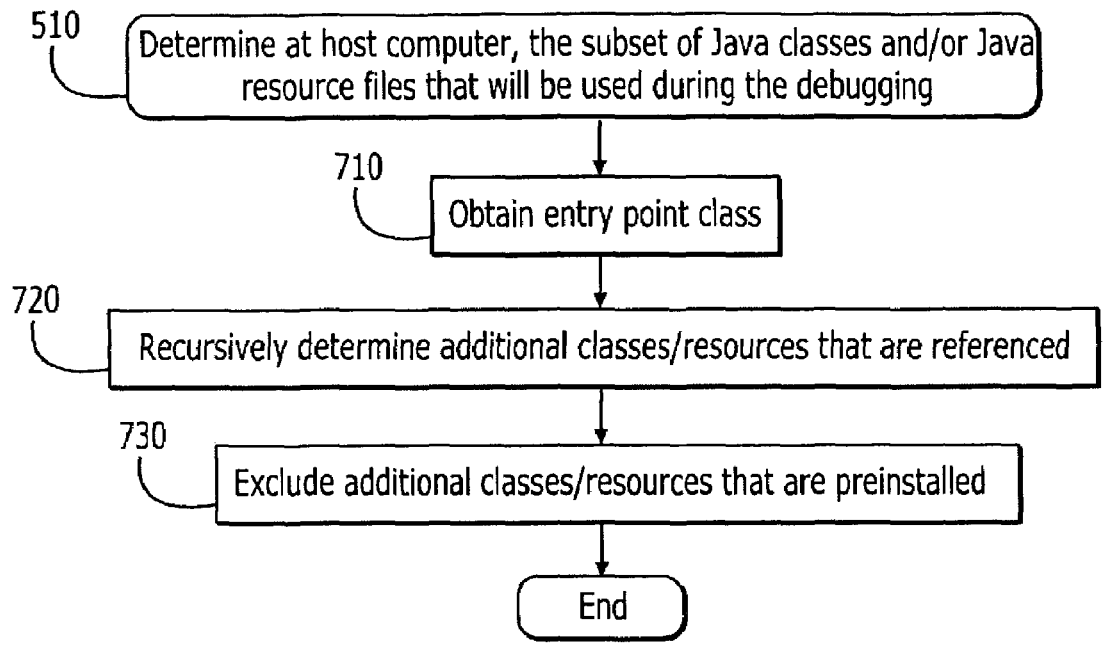

FIG. 7 is a flowchart of operations that may be used to determine, at the host computer 220, the subset of Java classes and/or Java resource files that will be used during the debug, which may correspond to Block 510 of FIG. 5. As shown in FIG. 7, at Block 710, an entry point class for the debugging the Java application is obtained. Then, at Block 720, the additional Java classes and/or Java resource files that are referenced from the entry point class during the debugging of the Java application are recursively determined so that additional classes/resource files that are referenced and additional classes/resource files that are referenced by the additional classes/resource files, etc. are determined. At Block 730, additional Java classes and/or Java resource files that are preinstalled in the J2ME device 240 are excluded. It will be understood that operations of Block 730 may be performed simultaneously and/or after operations of Block 720. Thus, Java classes and/or resources that are recursively determined to be referenced during the debugging, except for those Java classes/resources that are preinstalled, may be loaded into the J2ME device from the host at Block 520. In particular, in some embodiments, loading is performed by installing a JAR file on the J2ME device and loading the additional classes/resource files that are recursively determined, except for the additional Java classes/resources that are preinstalled, into the JAR file on the J2ME device.

It will be understood that, in some embodiments, the operations of Block 510 and FIG. 7 may be performed using the pseudo-emulator 230 on the host computer 220, so that the subset of classes and/or Java resources can be determined at the host computer 220. Then, the Java classes and/or Java resource files are loaded onto the J2ME device 240. It also will be understood that combinations and subcombinations of FIGS. 3-7 may be provided according to other embodiments of the present invention.

Figure 8:
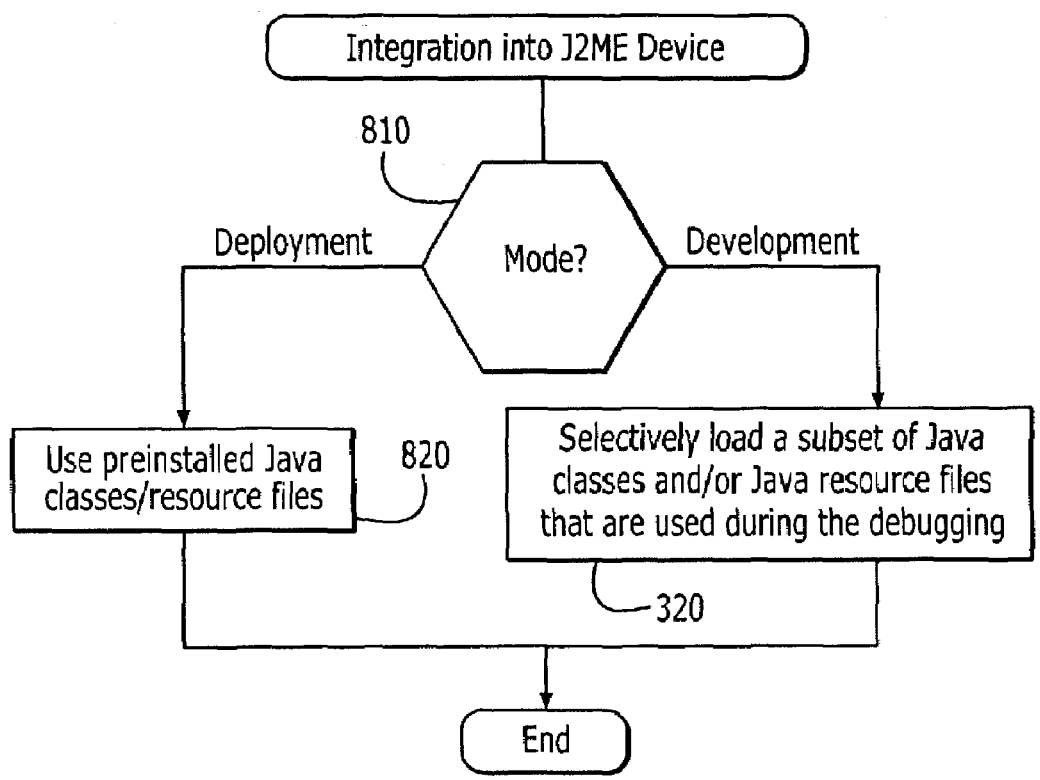

FIG. 8 is a flowchart of operations that may be used to integrate development and deployment modes of a J2ME device according to embodiments of the present invention. As shown in FIG. 8, a device mode is selected in the J2ME device 240, at Block 810, using conventional techniques. If a development mode is selected at Block 810, then operations of Block 320 according to embodiments of the present invention are performed to selectively load from a host computer into the J2ME device, a subset of Java classes and/or Java resource files that is used during the debugging the Java application in the J2ME device, that is automatically selected from a set of Java classes and/or Java resource files in the host computer. It will be understood that the application may be run and/or debugged by a developer in the development mode. In contrast, if a deployment mode is entered, then at Block 820, preinstalled Java classes and/or Java resource files are used to run the application during the deployment mode of the device. Thus, off-device class loading is used for development mode, whereas on-device class loading is used for deployment mode. A class loader on the JVM may, therefore, be modified in some embodiments of the present invention, to get files from the host during development mode, but to get files from the J2ME device's own file system during deployment mode.

Further discussion of embodiments of the present invention now will be provided. Prior to the present invention, when performing on-device source-level debugging of Java applications 160, the host 120 generally packaged all classes and other resource files in a CLASSPATH passed by the Java IDE 110 through the UEI interface. As is well known to those having skill in the art, a CLASSPATH is an environment variable on a JVM that indicates where Java classes and other resource files are located. It lists the names of directories that contain the compiled Java classes. The JAR file contains the Java classes and/or resources themselves. Thus, the size of this single JAR file was usually very large. The large JAR file, which can be on the order of 1 Mb or more in size, would then be installed on the J2ME device. This installation may take a considerable amount of time, for example on the order of several minutes, which may make the on-device debugging unusable for the Java developer. Moreover, in many situations, the JAR file would simply exceed the storage capacity of the J2ME device and would not load successfully. In other situations, the developer could manually package classes/resources that may be needed during debugging. However, developer selection can introduce errors Some embodiments of the invention may stem from a realization that the CLASSPATH may include extra library files that may not be needed, but the Java IDE would not know which classes will be used to debug the Java application. This problem is not limited to Java classes, since it also affects Java resource files, such as images, audio files and/or any other data files that may be included in the CLASSPATH.

However, with off-device class loading according to dynamic embodiments of the present invention, the KVM 250 running the J2ME device 240 starts running and debugging the MIDlet (application) 260 without having previously loaded the Java classes and/or resource files into the J2ME device. Instead of packaging the contents of the CLASSPATH into a potentially huge JAR file, an empty JAR file is installed into the J2ME device 240 and the name of the entry point class (the class that extends the MIDlet) is passed to the KVM 250. The KVM 250 then starts running the Java application 260, and when it needs to load a class or resource file, it makes a request to the IDE 210 running on the host 220 that is attached by serial, infrared, Bluetooth and/or other wired and/or wireless interface 270. The host 220 keeps a copy of the original CLASSPATH, locates the requested file or resource and then transfers the file to the J2ME device 240. In this manner, in some embodiments, only the files that are required by the KVM 250 during debug are ever transferred to the J2ME device. It is, thus, possible to quickly perform an on-device debug session using a Java IDE that supports the UEI interface. The startup time can be dramatically reduced.

In static embodiments of the invention, as described, for example, in FIG. 4, a smart CLASSPATH packager can begin with the UEI CLASSPATH and the entry point class. Starting with this entry point class, the Host Off-Device Class/Resource Loading functionality 280 determines which classes are referenced by inspecting the class file and looking for referenced classes. In a recursive manner, each newly referenced class may be inspected to determine which classes it references. As a result, a list or subset of all the classes that appear to be required to run/debug the MIDlet 260 is created. The smart CLASSPATH packager can also exclude from this list all classes that are known to be preinstalled, for example in Read Only Memory (ROM) of a particular J2ME device. As a result, a short list of class files may be created and this list is used to create a smaller JAR file. All resource files (non-class files) in the CLASSPATH may also be included in the JAR file. One technique to determine which resource files would be needed is to actually run/debug the application in the pseudo-emulator 230. Moreover, the set of resources may be dynamic in that it can depend on which code paths are exercised while the application is run/debugged.

Figure 9:
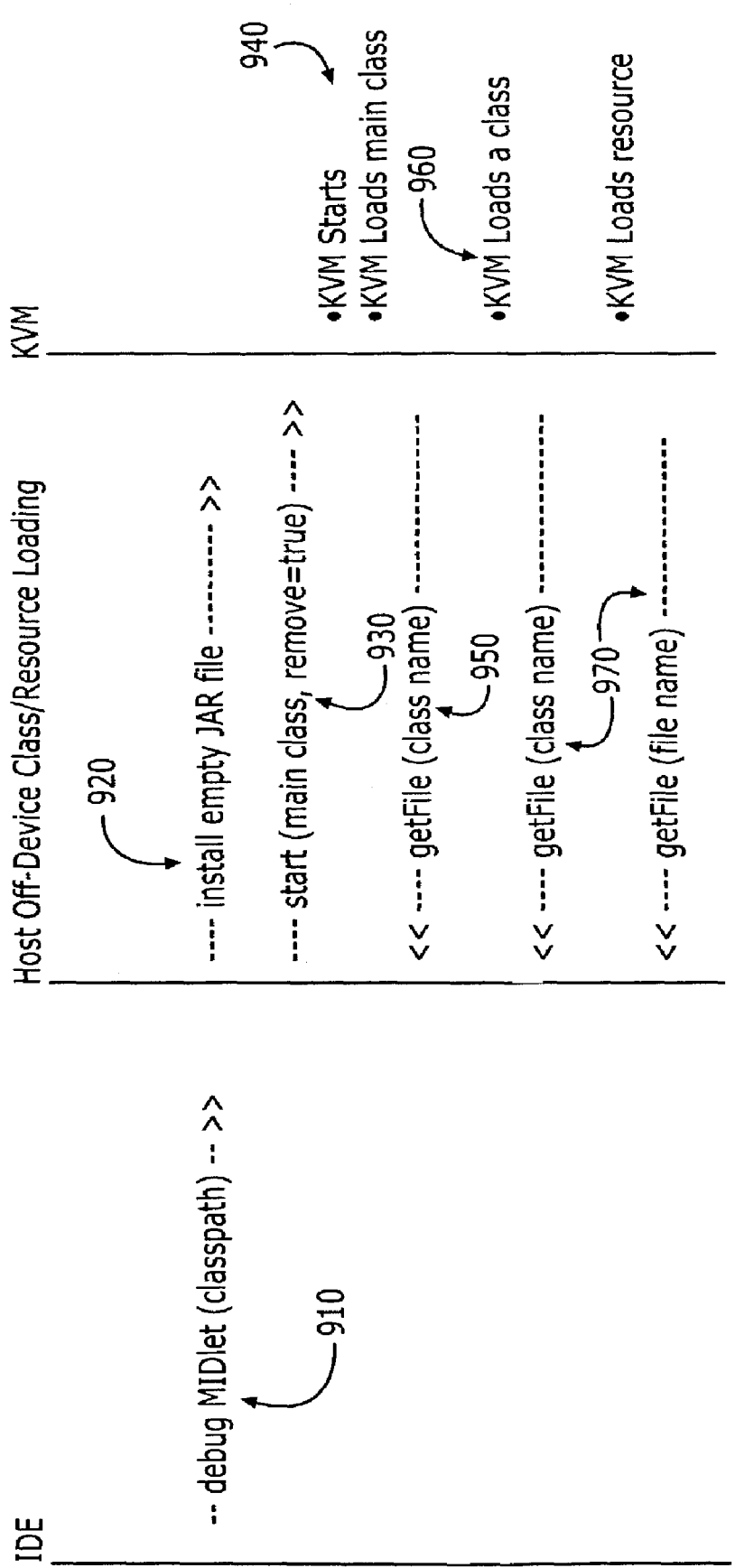
FIGS. 9 and 10 are flow diagrams illustrating examples of debugging a Java application in a J2ME device according to embodiments of the present invention.

Additional details of some embodiments of the present invention now will be provided. FIG. 9 is a flow diagram of a specific example of operations that may be performed to load Java classes and/or Java resource files from the host computer 220 into the J2ME device 240 as they are referenced during the debugging the Java application (as shown, for example, at Block 410 of FIG. 3) and specifically illustrates operations that may be performed in FIG. 6.

As shown in FIG. 9, an IDE initiates the debug operation at operation 910, and an empty JAR file is installed on the KVM at operation 920, which may correspond to Block 610 of FIG. 6. The debug operation is started at operations 930 and 940, which may correspond to Block 630 of FIG. 6. At operation 950, the Java class and/or Java resource file is requested from the host, which may correspond to Block 630 of FIG. 6, and at operation 960 the KVM loads the class, which may correspond to Block 640. These operations may continue at operations 970 as the debugging proceeds, for example as was shown at Block 660 of FIG. 6.

An example protocol that can be used by the KVM 250 in the J2ME device 240 to communicate with the Host Off-Device Class/Resource Loading functionality 280 running on the host 220 is as follows:

---

Format of KVM Request:
    <getFile name="[file_name]"/>
Format of positive host response:
    [4-bytes size][N-bytes of data]

---

The 4-byte size may be written to the interface 270 in big endian order, with the most significant byte first and the least significant byte last.

Format of Negative Host Response:

[0x00 0x00 0x00 0x00]

Figure 10:

A specific example of operations that may be performed to execute a getFile operation 950, 970 of FIG. 9 is illustrated in FIG. 10. The communications between the Off-Device Class/Resource Loading functionality 280 on the host and the KVM 240 are shown. Example requests may be illustrated by the following:

```
<getFile name="/com/semc/example/ManyBalls.class"/>
<getFile name="/rsc/Image1.png"/>
```

In conclusion, embodiments of the invention can allow on-device source level debugging of Java applications to be performed in a J2ME device in a way that can be more efficient and/or robust so as to be usable by a third party application developer. The device manufacturer may not need to supply third party developers with a device-accurate emulator for each J2ME device they are marketing. Instead, the Java developer can develop applications using the most accurate environment possible: the actual J2ME device. Moreover, the developer may debug applications using an IDE of their choosing.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for debugging an object oriented programming language application in a memory limited object oriented programming language device, comprising:
   determining at the host computer, a subset of object oriented programming language classes and/or object oriented programming language resource files that is used during the debugging the object oriented programming language application; and
   loading the subset of object oriented programming language classes and/or object oriented programming language resource files that was determined into the memory limited object oriented programming language device from the host computer;
   wherein the determining comprises:
   obtaining an entry point class for the debugging the object oriented programming language application; and
   recursively determining additional object oriented programming language classes and/or object oriented programming language resource files that are referenced from the entry point class during the debugging the object oriented programming language application, while excluding additional object oriented programming language classes and/or resource files that are preinstalled in the memory limited object oriented programming language device.

2. A method according to claim 1 wherein the loading the subset of object oriented programming language classes and/or object oriented programming language resource files that was determined into the memory limited object oriented programming language device from the host computer comprises:
   installing an object oriented programming language archive file on the memory limited object oriented programming language device; and
   loading the entry point class and the additional object oriented programming language classes and/or object oriented programming language resource files that are recursively determined, except for the additional object oriented programming language classes and/or object oriented programming language resource files that are preinstalled in the memory limited object oriented programming language device, into the memory limited object oriented programming language device.

3. A method according to claim 1 wherein the determining comprises:
   debugging the object oriented programming language application on an emulator at the host computer; and
   determining at the host computer, the subset of object oriented programming language classes and/or object oriented programming language resource files that will be used during the debugging the object oriented programming language application, based on the debugging the object oriented programming language application on the emulator at the host computer.

4. A method according to claim 1 wherein the loading further comprises loading object oriented programming language classes and/or object oriented programming language resource files from the host computer into the memory limited object oriented programming device as they are referenced during the debugging the object oriented programming language application.

5. A system for debugging an object oriented programming language application in a memory limited object oriented programming language device, comprising:
   a host computer;
   an Integrated Development Environment (IDE) on the host computer; and
   an off-device class/resource loader configured to:
   determine at the host computer, a subset of object oriented programming language classes and/or object oriented programming language resource files that is used during the debugging the object oriented programming language application; and
   load the subset of object oriented programming language classes and/or object oriented programming language resource files that was determined into the memory limited object oriented programming language device from the host computer;
   wherein the determining comprises:
   obtaining an entry point class for the debugging the object oriented programming language application; and
   recursively determining additional object oriented programming language classes and/or object oriented programming language resource files that are referenced from the entry point class during the debugging the object oriented programming language application, while excluding additional object oriented programming language classes and/or resource files that are preinstalled in the memory limited object oriented programming language device.

6. A system according to claim 5, wherein the loading the subset of object oriented programming language classes and/or object oriented programming language resource files that was determined into the memory limited object oriented programming language device from the host computer comprises:
   installing an object oriented programming language archive file on the memory limited object oriented programming language device; and
   loading the entry point class and the additional object oriented programming language classes and/or object oriented programming language resource files that are recursively determined, except for the additional object oriented programming language classes and/or object oriented programming language resource files that are preinstalled in the memory limited object oriented programming language device, into the memory limited object oriented programming language device.

7. A system according to claim 5, wherein the determining comprises:

debugging the object oriented programming language application on an emulator at the host computer; and determining at the host computer, the subset of object oriented programming language classes and/or object oriented programming language resource files that will be used during the debugging the object oriented programming language application, based on the debugging the object oriented programming language application on the emulator at the host computer.

8. A system according to claim 5, wherein the loading further comprises loading object oriented programming language classes and/or object oriented programming language resource files from the host computer into the memory limited object oriented programming language device as they are referenced during the debugging the object oriented programming language application.

9. A computer program product for debugging an object oriented programming language application in a memory limited object oriented programming language device, the computer program product comprising a computer usable storage medium having computer-readable program code embodied in the medium, the computer-readable program code comprising:

computer-readable program code that is configured to determine at a host computer, a subset of object oriented programming language classes and/or object oriented programming language resource files that is used during the debugging the object oriented programming language application; and computer-readable program code that is configured to load the subset of object oriented programming language classes and/or object oriented programming language resource files that was determined into the memory limited object oriented programming language device from the host computer;

wherein the computer-readable program code that is configured to determine comprises:

computer-readable program code that is configured to obtain an entry point class for the debugging the object oriented programming language application; and computer-readable program code that is configured to recursively determine additional object oriented programming language classes and/or object oriented programming language resource files that are referenced from the entry point class during the debugging the object oriented programming language application, while excluding additional object oriented programming language classes and/or resource files that are preinstalled in the memory limited object oriented programming language device.

10. A computer program product according to claim 9, wherein the computer-readable program code that is configured to load the subset of object oriented programming language classes and/or object oriented programming language resource files that was determined into the memory limited object oriented programming language device from the host computer comprises:

computer-readable program code that is configured to install an object oriented programming language archive file on the memory limited object oriented programming language device; and computer-readable program code that is configured to load the entry point class and the additional object oriented programming language classes and/or object oriented programming language resource files that are recursively determined, except for the additional object oriented programming language classes and/or object oriented programming language resource files that are preinstalled in the memory limited object oriented programming language device, into the memory limited object oriented programming language device.

11. A computer program product according to claim 9, wherein the computer-readable program code that is configured to determine comprises:

computer-readable program code that is configured to debug the object oriented programming language application on an emulator at the host computer; and computer-readable program code that is configured to determine at the host computer, the subset of object oriented programming language classes and/or object oriented programming language resource files that will be used during the debugging the object oriented programming language application, based on the debugging the object oriented programming language application on the emulator at the host computer.

12. A computer program product according to claim 9, wherein the computer-readable program code that is configured to load further comprises computer-readable program code that is configured to load object oriented programming language classes and/or object oriented programming language resource files from the host computer into the memory limited object oriented programming language device as they are referenced during the debugging the object oriented programming language application.

* * * * *